United States Patent [19]

Soski et al.

[11] 4,395,760
[45] Jul. 26, 1983

[54] ELECTRONIC BASEBALL GAME

[76] Inventors: Norbert S. Soski, 16641 Calneva Dr., Encino, Calif. 91436; Richard S. Levine, 8400 Edinger Ave., Huntington Beach, Calif. 92647

[21] Appl. No.: 223,184

[22] Filed: Jan. 7, 1981

[51] Int. Cl.³ .................. G06F 15/44; A63F 9/00
[52] U.S. Cl. .................. 364/410; 273/85 G; 273/88; 364/411
[58] Field of Search .............. 364/410, 411, 412; 340/323 R; 273/1 E, 1.5 R, 85 R, 85 G, 237, 313, DIG. 28, 88

[56] References Cited

U.S. PATENT DOCUMENTS

| 3,606,329 | 9/1971 | Wilson | 273/88 |
| 3,790,170 | 2/1974 | Alexander, Jr. | 273/88 |
| 3,860,239 | 1/1975 | Feuer et al. | 273/88 |
| 4,195,838 | 4/1980 | Santandrea et al. | 273/88 |
| 4,324,402 | 4/1982 | Klose | 273/88 |

Primary Examiner—Jerry Smith
Attorney, Agent, or Firm—Reagin & King

[57] ABSTRACT

An electronic baseball game in which the display represents the prespective of a batter standing in the batter's box. In a preferred embodiment, a pitcher throws randomly selected pitches to the batter which move through a number of positions to end in or out of a strike zone and an operator may swing at the end pitch by depressing a hit key. The timing of the operator's depression determines the results of each swing.

5 Claims, 7 Drawing Figures

ELECTRONIC BASEBALL GAME

This invention relates to electronic games and, more particularly, to an electronic baseball game.

Games have been popular throughout the ages. Those game which are related to or represent the play of sporting contests have been especially popular. The advent of semiconductor circuitry and especially of microcomputer circuitry has rendered such games even more popular. There are now small hand-held games on the market which allow one or more operators to play simulated games of football, basketball, soccer, baseball, and similar games. These games are especially attractive because they are so small and require such a small amount of power (usually furnished by a transistor battery) that they may be used in almost any situation without intruding on or disturbing persons nearby. It is difficult in designing modern electronic games which emulate sporting contests to represent the contest in such a way that a player feels as though he is participating in the game being represented electronically. For example, in an electronic baseball game an operator may bat a ball pitched by an electronic pitcher and on a random basis receive credit for a home run, a triple, some form of out, or the like. Although each of the possibilities available on each pitch is, in general, selected to occur in a statistically representative proportion of cases, the operator of the game who is batting does not undergo the same experience as does a batter standing in the batter's box swinging at a pitch thrown by a pitcher.

It is an object of this invention to provide a new and improved electronic baseball game.

It is an object of the present invention to provide a hand-held electronic baseball game which more realistically simulates the play of the offense and the pitcher in an actual baseball game.

SUMMARY OF THE INVENTION

The foregoing and other objects of this invention are accomplished by a hand-held electronic baseball game having a display which presents a batter's perspective of the field facing the pitcher. The display essentially presents a perspective view of the field to the batter and provides the operator with a view of each pitch as it travels to the batter's box as such a pitch would be seen by a batter.

In the preferred embodiment of the invention a number of different recognizable pitches are selected at random by the control circuitry of the game, and the batter (operator) swings at the ball as it reaches the batter's box by depressing a hit key. If the operator swings accurately he may hit a home run, while if he swings early or late, the result may be a triple, double, single or various outs depending both on the degree of the timing of the swing and upon random statistical factors. Since the operator sees the pitches from the batter's perspective, he may look over his pitches and may earn a walk to get on base. Once on base a batter may steal the next base if the windup of the pitcher is slow enough. To run, the operator depresses a run key repeatedly as rapidly as possible to emulate running around the bases. The batter may, in the preferred embodiment, take an extra base by running more rapidly or be called out for running too slowly.

Other objects, features, and advantages of the invention will become apparent by reference to the specification taken in conjunction with the drawings in which like elements are referred to by like reference designations throughout the several views.

DESCRIPTION OF THE PREFERRED EMBODIMENT

Figure 1:
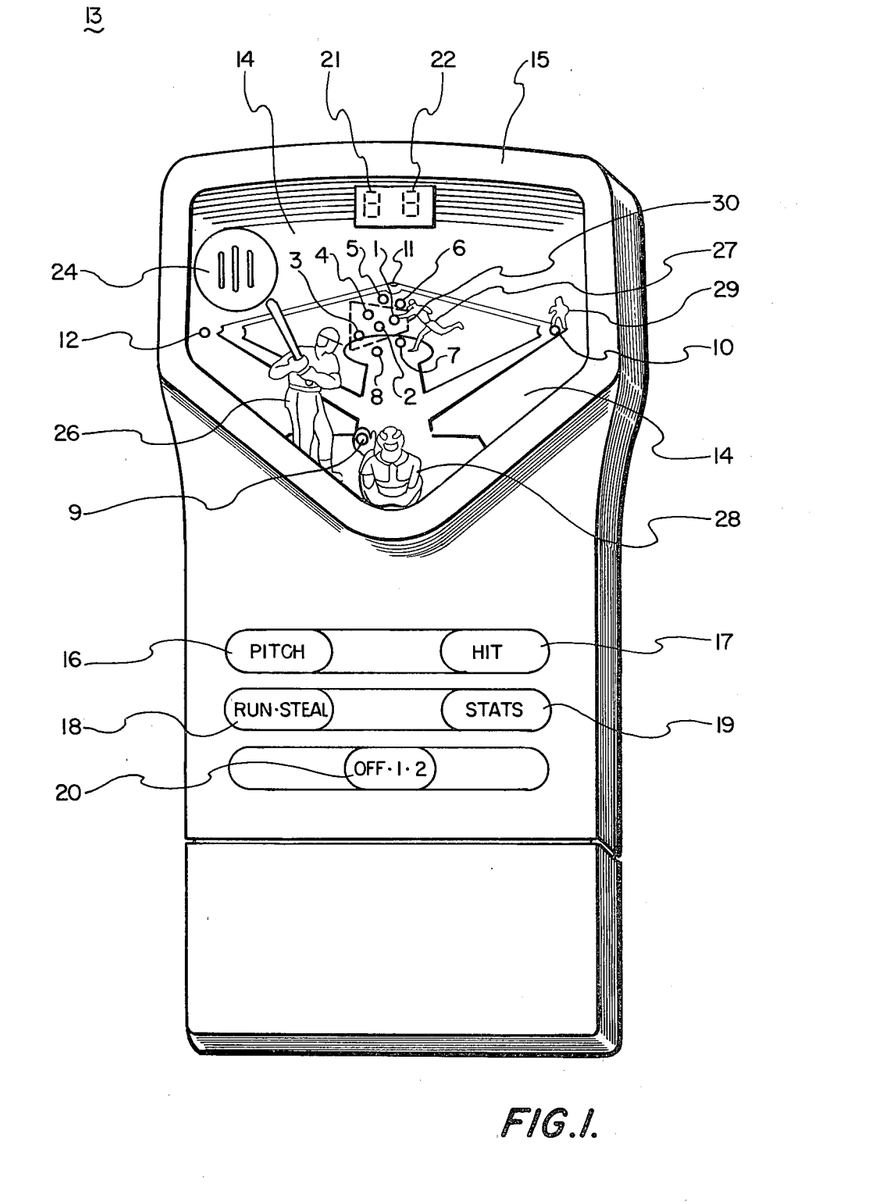
FIG. 1 is a perspective view of a hand-held electronic baseball game constructed in accordance with the invention.

Referring now to FIG. 1 there is shown a perspective view of an electronic hand-held baseball game 13 constructed in accordance with the invention. The game 13 includes a housing 15 which may be constructed of a moldable plastic material many of which are well known in the prior art. Although not shown, the housing 15 may be molded in two separate parts and be connected together by well known means to enclose electronic circuitry for the control of the game 13. Conventional means may be provided in the housing (although not shown) for inserting and replacing batteries (such as a nine volt transistor battery). Mounted on the upper surface of the housing 15 is a display 14 which may in a preferred embodiment comprise a sheet of translucent material (such as a plastic) behind which are positioned various lights. Also mounted on the upper surface of the housing 15 are keys, buttons, or switches 16, 17, 18, 19, and 20 which are used by an operator in controlling the game. At the upper center of the display 14 are a pair of display digits 21 and 22 which are used for various purposes during the operation of the game such as providing scoring. Also mounted on the upper surface of the housing 15 is a speaker 24 (which may in the preferred embodiment be a piezo-ceramic transducer) utilized to provide signals for informing the operator of the status of play.

The display 14 has pictured on its upper surface of batter 26, a pitcher 27, and a catcher 28. Positioned behind the upper surface of the display 14 are lights for nine different ball positions (labeled from one to nine). As will be noted, position number one is in the hand of the pitcher 27 while position number nine is in the mitt of the catcher 28. Also positioned behind the upper surface of the display 14 are three lights ten, eleven, and twelve which are used to designate a runner on first, second, and third base, respectively. In the preferred embodiment, the lights for illuminating the ball and runner positions may be light emitting diodes (LEDs).

The play of the game takes place as follows. Power is provided to the game 13 by moving the slide switch 20 from the off (left) position to either of the two other positions. In the one position, the pitch is somewhat easier for a batter to hit because it remains lit over the plate for approximately twice as long as in the number two position; and a runner has approximately twice as long to travel between bases. Other than the foregoing, the two modes of the game 13 are similar. In the preferred embodiment, an operator can change between positions one and two between innings or between halves of innings.

Once the game 13 has been turned on by moving the switch 20 to either the one or the two position, a charge tune is played, the ball light goes on at ball position one on display 14 so that the ball appears to be in the hand of the pitcher. An operator viewing the display 14 sees the ball and the digits 21 and 22 which signify the number of balls and strikes with each pitch, the digit 21 showing the number of balls and the digit 22 showing the number of strikes. Of course, with the first man just coming to bat, the digits 21 and 22 both show zeros.

When ready to play, the operator depresses the pitch key 16. This causes the light at ball position one to turn off and, in sequence, the lights at first ball position seven, then ball position six, and finally ball position one to turn on. As each succeeding position is turned on, the last position is turned off and a short high pitched sound is made. The purpose of this initial presentation of ball positions is to simulate a windup before the pitch. After reaching ball position one the second time, various other ball positions are lit sequentially in order to provide a pitch to the batter. This sequential lighting of ball positions causes the ball to appear to travel toward the batter 26 standing at the place.

The control circuitry of the game 13 selects at random one of eight different pitches for delivery to the batter. The following pitches are produced by the positions given being lit in sequence:

Fast ball—position one to position two.
Sinker—position one to position two to position eight.
Changeup—position one to position two to position three.
Rising Fastball—position one to position two to position six.
Slider—position one to position six to position five to position four to position two to position three.
Blooper Pitch—position one to position six to position five to position four to position two to position eight.
Screwball—position one to position four to position two to position one to position four to position two to position one to position four to position two.
Knuckle Screwball—position one to position four to position two to position one to position four to position two to position one to position four to position seven.

The display 14 also has superimposed on its upper face a strike zone shown as outline 30. It will be noted that the ball positions one, two, three, and four lie within the strike zone while positions five, six, seven, and eight lie outside the strike zone. A pitch finishing within the strike zone is a strike and should be swung at by the batter. A pitch finishing in one of the ball positions five, six, seven, or eight outside of the strike zone is a ball and should not be struck at by the batter (it is considered a strike if swung at). It should be noted that all of the pitches proceed at normal speed except for the fast ball and the rising fast ball which proceed at twice the speed of the normal pitch. It should also be noted that during the time the ball is in position one on its way to the batter 26, the ball position light changes from dim to bright on an incremental basis. The lights at each of the remaining ball positions during each pitch remain brightly lit, and, during the travel of the ball toward the batter 26, the speaker 24 provides a tone which rises steadily in pitch as the ball progresses.

When the ball reaches the batter 26, the operator may depress the key 17. If the operator depresses the hit key 17 before the ball arrives, a strike is recorded. If the operator depresses the hit key 17 on the instant the ball arrives and the ball is in the strike zone, a hit will be scored which will be a home run. If the operator depresses the hit key slightly later than the instant the ball arrives at its last position within the outline 30 but before the catcher catches it, in most cases a triple is scored; even later, a double; and later, a single. On a random basis of one-in-five, a batter flys out rather than getting a double or a triple. On a random basis of one-out-of-sixteen and increasing in frequency as the time at which the hit key 17 is depressed occurs later during the on time at the last ball position, what normally would be a single is recorded as a ground out.

If the last position of the ball during a pitch is positive five, six, seven, or eight and the batter 26 swings (the operator depresses the hit key 17), a strike is recorded because the ball is in too poor a position to be hit. If, on the other hand, the hit key 17 is not depressed and the ball ends in position five, six, seven, or eight, a ball is recorded. If the hit key 17 is not depressed and the ball ends in position one, two, three, or four, a strike is recorded.

If a batter 26 receives three strikes before receiving four balls, the batter is out. If the batter 26 receives four balls before receiving three strikes, the batter walks to first base.

If a batter receives a hit, which is indicated by a triple rising tone followed by another tone produced by the speaker 24 (one beep indicates a single; two beeps, a double; three beeps, a triple; charge sound, a home run), the ball remains in the last ball position and gradually dims. Instead of providing the sound that a base hit has occurred, the ball may move from the last position into the catcher's mitt to indicate a foul tip in which case strike three will not occur, but otherwise a strike will be recorded. Alternatively, the ball may fade and then the speaker 22 produces a buzz to indicate a ground out or a fly out.

When a batter 26 receives a base on balls, the control circuitry of the game 13 causes the speaker 24 to produce a tone indicating the runner is moving to first base. At the same time the light indicating first base lights dimly and grows brighter as the runner approaches first base. When the runner reaches first base, the first base light is at its brightest. When a player 26 hits a home run, the control circuitry causes all players on base and the hitter to complete the run of the bases. If runners are ahead of a player who walks or a player who hits and runs, the control circuitry automatically advances them ahead of the batter.

If a player hits the ball and gets a single, a double, or a triple, the operator must repeatedly depress the run-steal key 18 to cause the player to advance. The faster the rate at which the key 18 is depressed, the faster the runner moves. In the preferred embodiment, the number of depressions of the key 18 necessary to run between two bases is approximately equal to the number of running steps there between. The control circuitry provides a sufficient amount of time for a runner running a given number of bases to run to the prescribed base and possibly one more. Consequently, if an operator depresses the key 18 too slowly, the runner may not be able to reach the base in time and will be called out. Once a runner reaches base, he is advanced by runners following him who hit the ball or are advanced by a base on balls.

The lead runner on base may also steal a base in the following manner. If the pitcher's windup is a slow windup as contrasted to a fast windup (a slow windup takes twice the time of a fast windup), a batter may steal the next base by depressing the run/steal key 18 during the windup. In such a case, the control circuity of the game 13 automatically moves the batter to the next base and lights the batter at that base to indicate the steal has been successful.

The digits 21 and 22 are used to indicate the status of the game. After each pitch is thrown, the ball is returned to ball position number one for the next pitch and the balls and strikes which have been called are displayed by the digits 21 and 22. The digits 21 and 22 are also used to show the visitors' score by presenting a U followed by the number of runs scored by the visitors' team. The home score is represented by an H followed by the number of runs scored by the home team. The team presently at bat is represented by digits 21 and 22 by an H or a U, the inning by a number indicating the inning, and the number of outs by a numeral. Additionally, the digits 21 and 22 are used to indicate whether an out is a groundout (Go), a strikeout (So), or a flyout (Fo) or an out during stealing or running (o). By depressing the stats key 19, the score of the two teams, the team at bat, the present inning, and number of outs are caused to be displayed by the digits 21 and 22.

It should be noted that each of the various pitches which may be thrown by the pitcher 27 in the preferred embodiment is almost identical to another pitch except for the last position of the ball. That is, the screwball and the knuckle screwball differ only in that the ball ends in ball position two for a screwball (indicating a strike) while the knuckle screwball ends in position seven (indicating a ball). Consequently, it is difficult for a batter 26 (the operator) to determine whether a pitch is a strike or a ball while the pitch is being thrown until the last position is reached. This adds to the excitement of playing the game.

The following list indicates the sounds which are produced in the preferred embodiment by the speaker 24 under control of the control circuitry of the game 13 in order to further enhance the play of the game and to indicate to the operator the status of play at any particular time.

| | | |
|---|---|---|
| High rising tone | means | the ball has been contacted |
| Charge | means | game begins |
| Click-click (fast or slow) | means | wind-up |
| Steady & low rising tone | means | pitch |
| Click | means | ball in the catcher's mitt or back to the pitcher |
| Hit sound + one high beep | means | possible single |
| Hit sound + two high beeps | means | possible double |
| Hit sound + three beeps | means | possible triple |
| Hit sound + charge | means | home run |
| Hit sound + buzz | means | groundout, flyout, out |
| Hit sound + click (for catcher) | means | foul tip |
| Buzz | means | strikeout or lead runner out |
| Fast tapping | means | runner walking to base, home run, runner stealing base |
| Buzz + low two notes | means | third out, change players |
| High two notes | means | run scored |
| Low beep | means | runner on base |
| Last notes of charge tune | means | game over |

Figure 2:
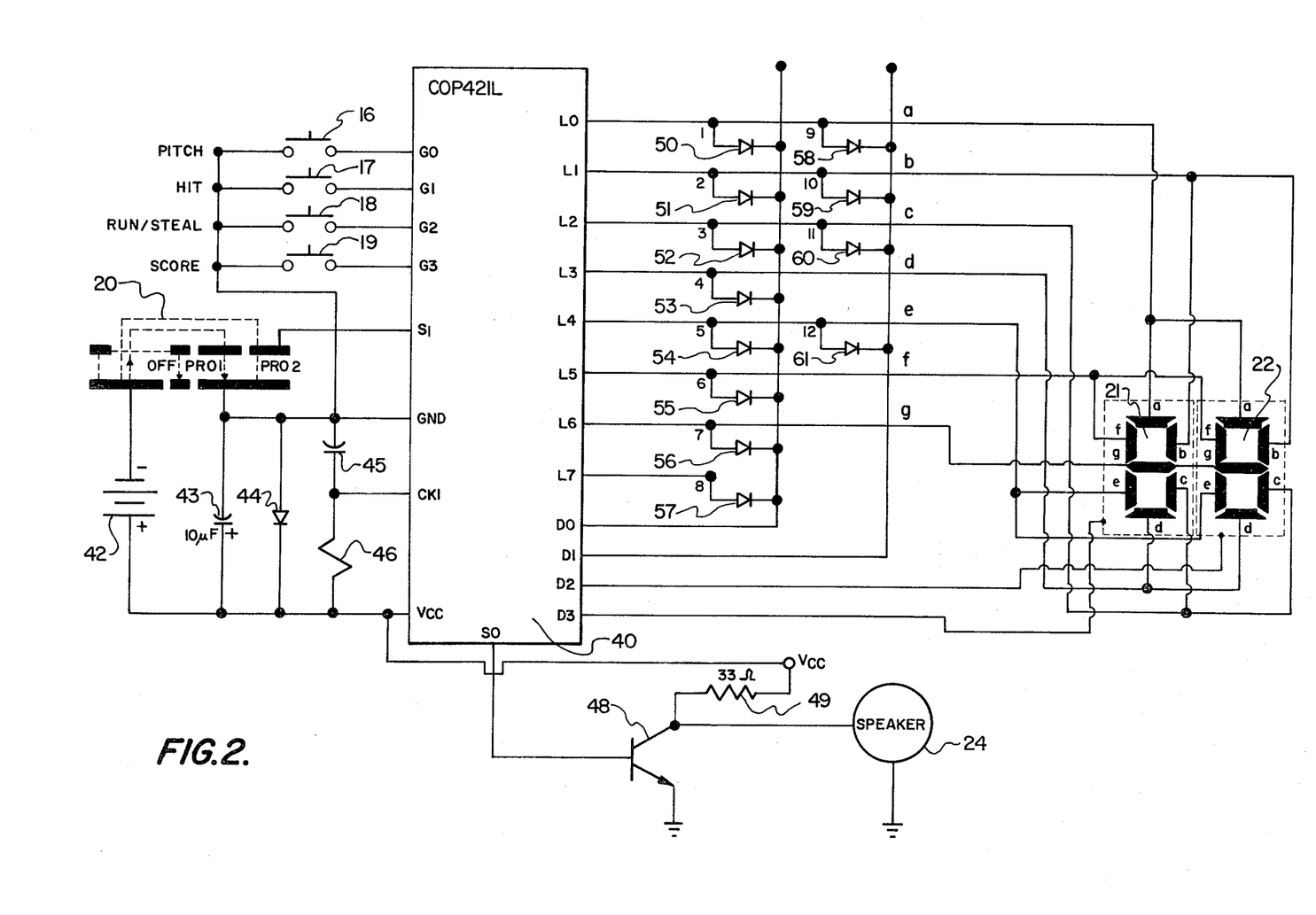
FIG. 2 is a partially-block, partially-schematic drawing showing the electronic circuitry utilized in the game of this invention.

FIG. 2 is a partially-schematic, partially-block diagram of the electronic circuitry used in the game 13 of the present invention. The game includes a control circuit 40 which controls the operation of the speaker 24, the digits 21, 22, and the display 14 in response to operation of the input keys 16–20. As may be seen in FIG. 2, the input keys 16–19 are connected to the circuit 40 at a number of terminals $G_0$–$G_3$, respectively. The other side of each of the keys 16–19 is connected to a GND terminal of circuit 40. The switch 20 is also connected to the circuit 40 at a terminal SI and the terminal GND. A battery 42, which may in a preferred embodiment be a nine volt transistor battery, is connected to the switch 20. The dotted lines illustrate that in the off position the negative terminal of the battery 42 is not connected to the circuit 40 while in the one position it is connected to the GND terminal and in the two position it is connected to both the SI and GND terminals and to a $V_{CC}$ terminal on the circuit 40 so that the operation of the switch 20 through either of the one or the two positions connects the battery 42 across the terminals GND and $V_{CC}$. A capacitor 43 and a diode 44 are also connected between the terminals $V_{CC}$ and GND, and a timing circuit including a capacitor 45 and a resistor 46 are connected across the same terminals of the circuit 40 with a center tap at a terminal CKI. A transistor 48 has its base connected to a terminal SO on the circuit 40, its collector connected to terminal $V_{CC}$ by means of a resistor 49, and its emitter connected to ground. The collector of the transistor 48 is connected to the speaker 24 which is also connected to ground.

Output terminals $L_0$–$L_7$ of the circuit 40 are connected to diodes 50–57 which indicate light emitting diodes showing the ball positions one through eight on display 14, respectively. The other side of these diodes 50–57 are connected to the circuit 40 at a terminal DO. Also connected to terminals $L_0$, $L_1$, $L_2$, and $L_4$ are light emitting diodes 58–61, respectively, which indicate ball position nine and first, second, and third bases. The other ends of the diodes 58–61 are connected to a terminal D1 on circuit 40. Each of the terminals $L_0$–$L_6$ is also connected to one of the segments a through g of the digits 21 and 22, respectively. The common connection of all the segments of digit 21 (as indicated by a dotted line in FIG. 2) is connected at a terminal D3 to the circuit 40, and the common connection of all of the segments of the digit 22 is connected at a terminal D2 of the circuit 40.

As will be understood by those skilled in the art, the control circuit 40 may be implemented in any of a number of different ways. However, as with many prior art electronic game circuits, the preferred embodiment of the invention utilizes integrated circuit microprocessors (miniature digital electronic computers). Such integrated circuit microprocessors are well known; and they include all of the input, output, memory, logic, and control circuitry of a special purpose digital computer in miniature form. In general, such circuits have both random access memory (RAM memory) and read only memory (ROM memory). The ROM memory has connections formed by masking operations during the construction of the basic circuitry of the control circuit to provide a completely wired circuit which includes the program for controlling the operation of the microprocessor. Such an arrangement is described as a dedicated memory circuit. The RAM memory of the processor is utilized for storage of the various bits of information utilized during the operation of the circuitry.

Various control circuits are offered by a number of manufacturers and are well known to the prior art. A preferred embodiment of the present invention uses a COP421L microprocessor manufactured by National Semiconductor. Further information on specific details of this microprocessor are available in the COPS CHIP USER'S MANUAL published by National Semiconductor.

FIGS. 3(a)–3(e) together constitute a flow chart explaining the operation of the program of the controller circuit 40 in a preferred embodiment of the invention. The program is entered at step 100 when the switch 20 is moved from the off to either the one or two position. At step 100, the RAM memory circuitry of the control circuit 40 is initialized, the display 14 is turned off, and the speaker 24 is caused to sound the series of notes which indicate the beginning of the game. From step 100, the program moves to step 102 at which the game 13 is placed in the automatic running mode, the display speed is set at normal speed, and an indication is stored that the first inning is about to be played. The program then moves to step 103 at which an indication is stored that the visitors' team is up to bat. From step 103, the program moves to step 104 at which the speaker 24 is caused to issue a sound indicating that the pitcher has received the ball (the ball is at position one).

From step 104 the program moves to step 106 at which the control circuit 40 is caused to disable a routine used to make ball movement sounds as the ball moves toward the batter during each pitch. The program then moves to step 107 to store indications that the pitcher has not yet pitched and the batter has not yet batted. From step 107, the program moves to step 108 to reset a counter utilized to select random numbers to determine which pitch will be thrown by the pitcher on the next ball. The program then moves to step 109 to light the ball position number one at which the ball is in the pitcher's hand, to present the statistics of balls and strikes at digits 21 and 22, and to light any runners which are on base at the present time (none initially). From step 109, the program moves to step 111 to determine whether the pitch key 16 has been depressed. If the pitch key 16 has not been depressed, the program moves to step 112 to determine whether the stats key 19 has been depressed. If the stats key 19 has been depressed at step 112, the program moves to step 113 shown in FIG. 3(c) to display a U at digit 22 indicating the visiting team, to step 114 to indicate at digits 21 and 22 the number of runs the visitors have scored, to step 115 to display an H at digit 22 indicating the home team, and to step 116 to show the number of runs the home team has scored.

The program then moves to step 118 to make a determination as to whether the game is over. If the game is over, the program moves back to step 113 and repeats the final scores of the visiting team and the home team. If the game is not over, the program moves to step 119 to show the team which is presently at bat at digit 22, to step 120 to indicate the current inning of play, and to step 121 to show the number of outs in the inning. From step 121, the program recycles to step 104 shown in FIG. 3(a) and continues through the program as explained above.

If at step 112 the stats key 19 has not been depressed, the program recycles to step 109 to cause the light at ball position number one to light, the digits 21 and 22 to display the number of balls and strikes, and any lights indicating runners on base to light, thus refreshing these indications on the display 14. The program then moves to step 111.

If at step 111 the pitch key 16 has been depressed, the program moves to step 123 to determine the status of switch 20 in order to determine the level of operation of the game. The program then moves to step 124 and on a random basis begins a slow or fast windup. During a slow windup, the ball travels from position one to seven to six and back to position one at a first speed. During a fast windup the ball travels the same route at twice the speed. From step 124, the program moves to step 125 to disable all lights on display 14 other than those indicating the ball position. The program then moves to step 126 to move the ball through all of the positions of the windup and to cause the speaker 24 to emit a sound for each step of the windup.

From step 126, the program moves to step 128 where a determination is made as to whether the run/steal key 18 has been pressed. If the key 18 has been pressed, the program moves to step 129 shown in FIG. 3(d). At step 129 a determination is made as to whether a runner is presently on base. If no runner is on base, the program cannot implement the steal operation and so moves to the next step 130 of the program shown in FIG. 3(e). If a runner is on base at step 129, the program moves to step 131 to determine whether the pitcher is in a fast windup. If the pitcher is not in a fast windup, the base is stolen; and the program moves to step 132 to provide a sound indicating that the base has been stolen and to step 133 to advance all runners by one base. The program then moves to step 135 shown in FIG. 3(b) which will be discussed below.

If at step 131 the pitcher is in a fast windup, the runner is thrown out; and the program moves to step 138 to set the automatic run mode and to step 139 to determine whether any players are presently on base. If no one is on base, the program recycles to step 104 at which the pitcher receives the ball and continues through the cycle as explained above. If runners are on base at step 139, the program moves to step 140 to cause the lead runner to be called out and to step 141 to store an indication for later display that an out has occurred.

Figure 3A:
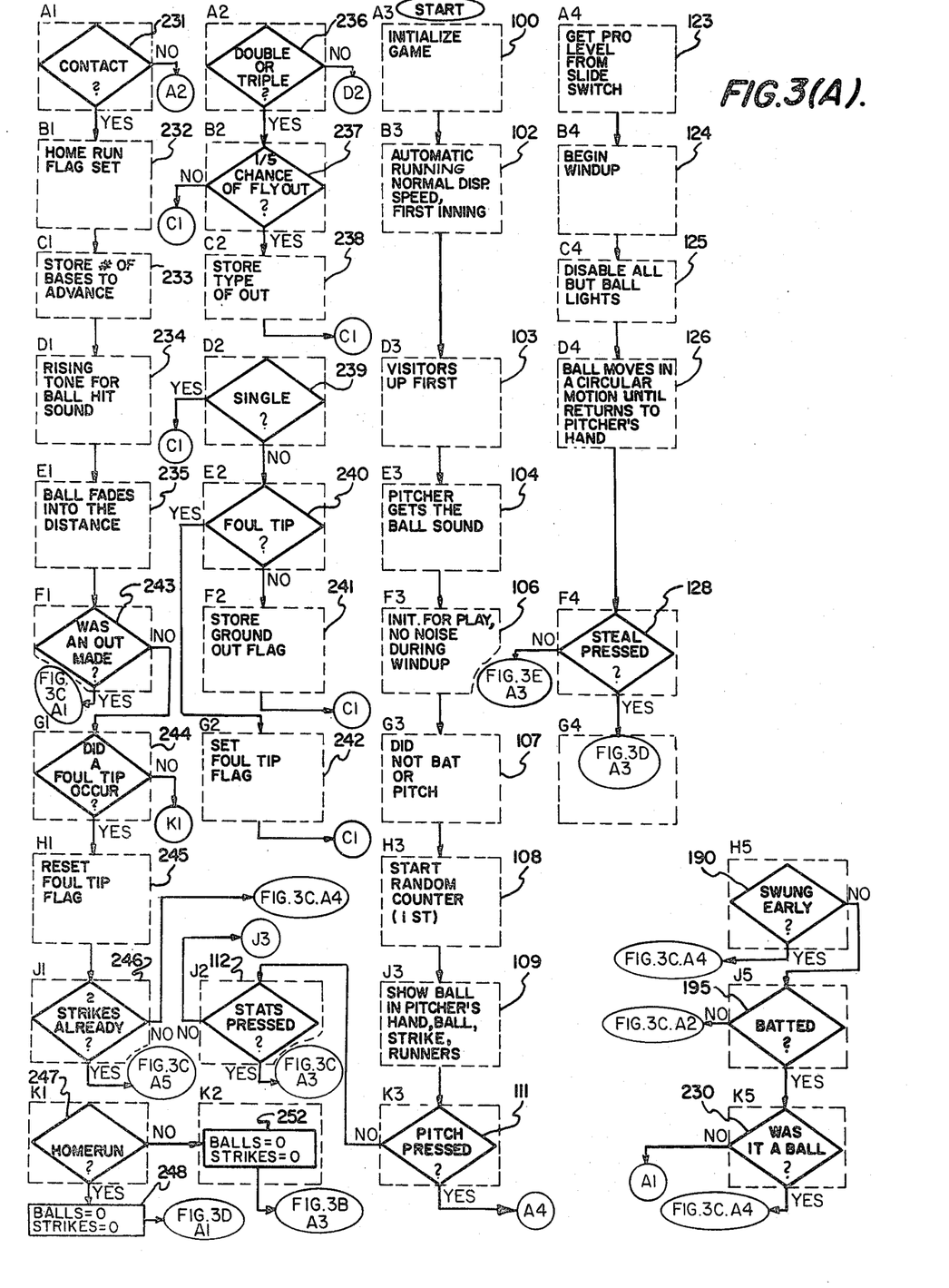
FIGS. 3(a)–3(e) are diagrams which together constitute a flow chart describing the operation of the electronic game of the present invention.
Figure 3B:
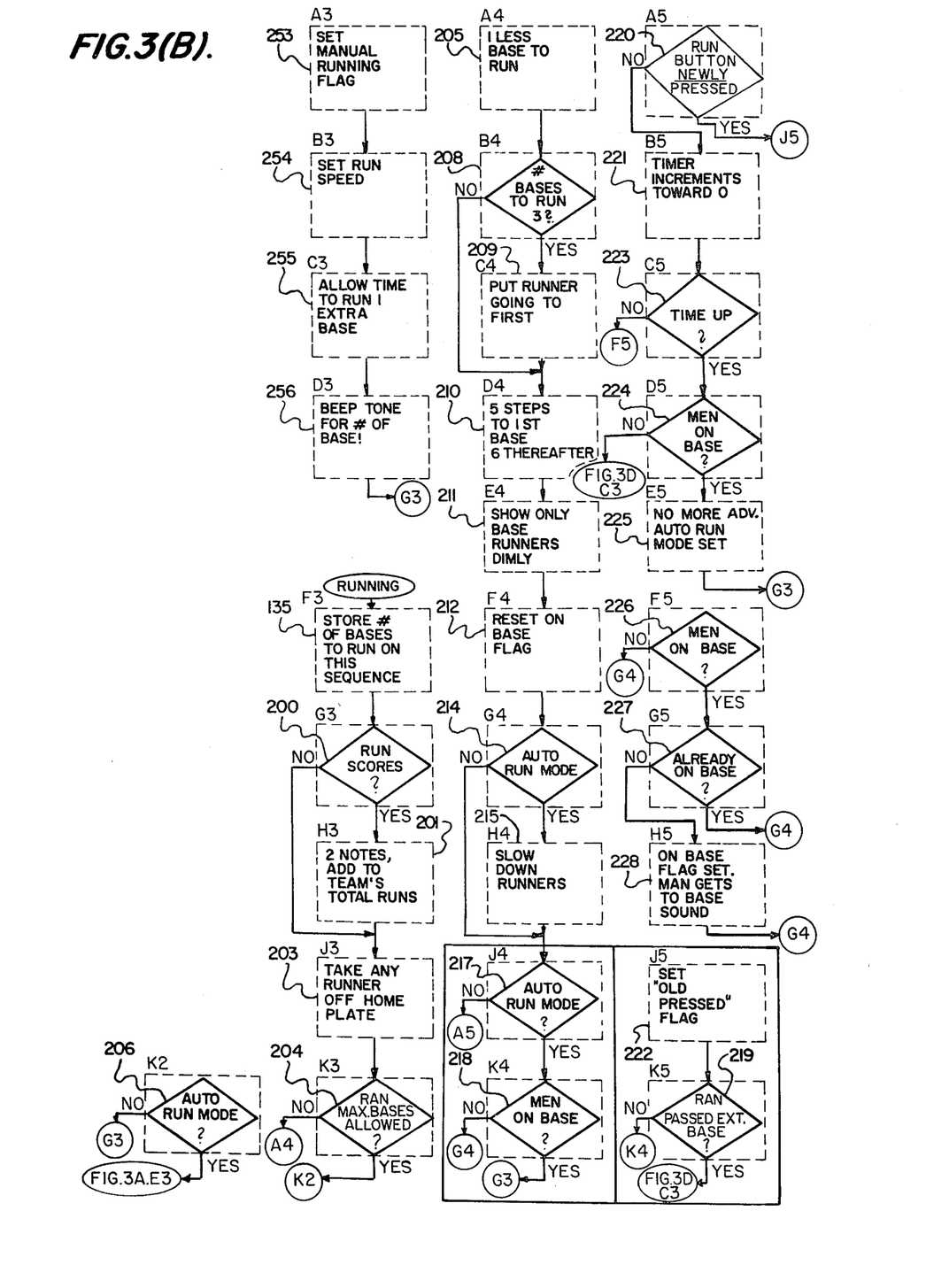
Figure 3C:
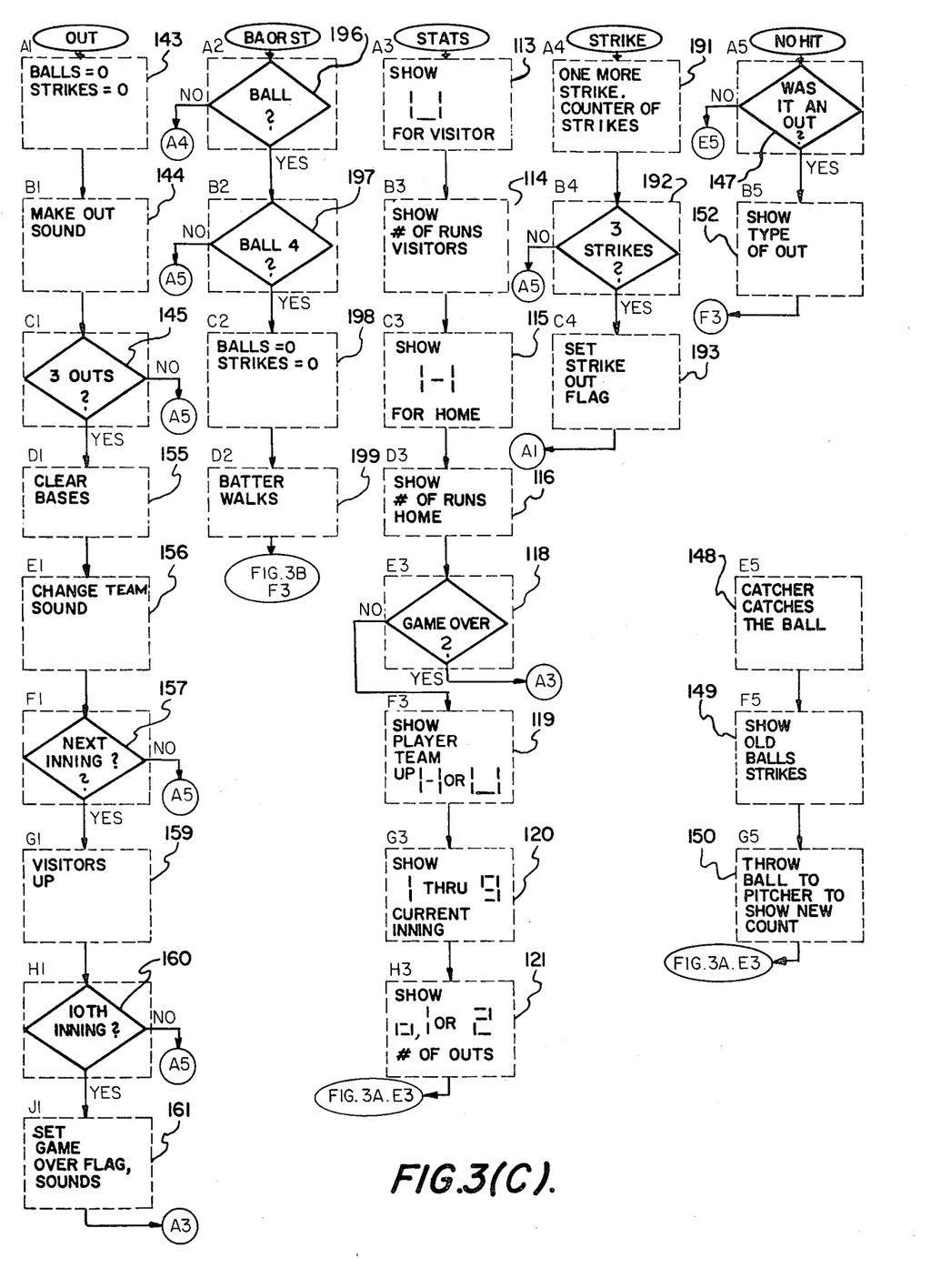
Figure 3D:
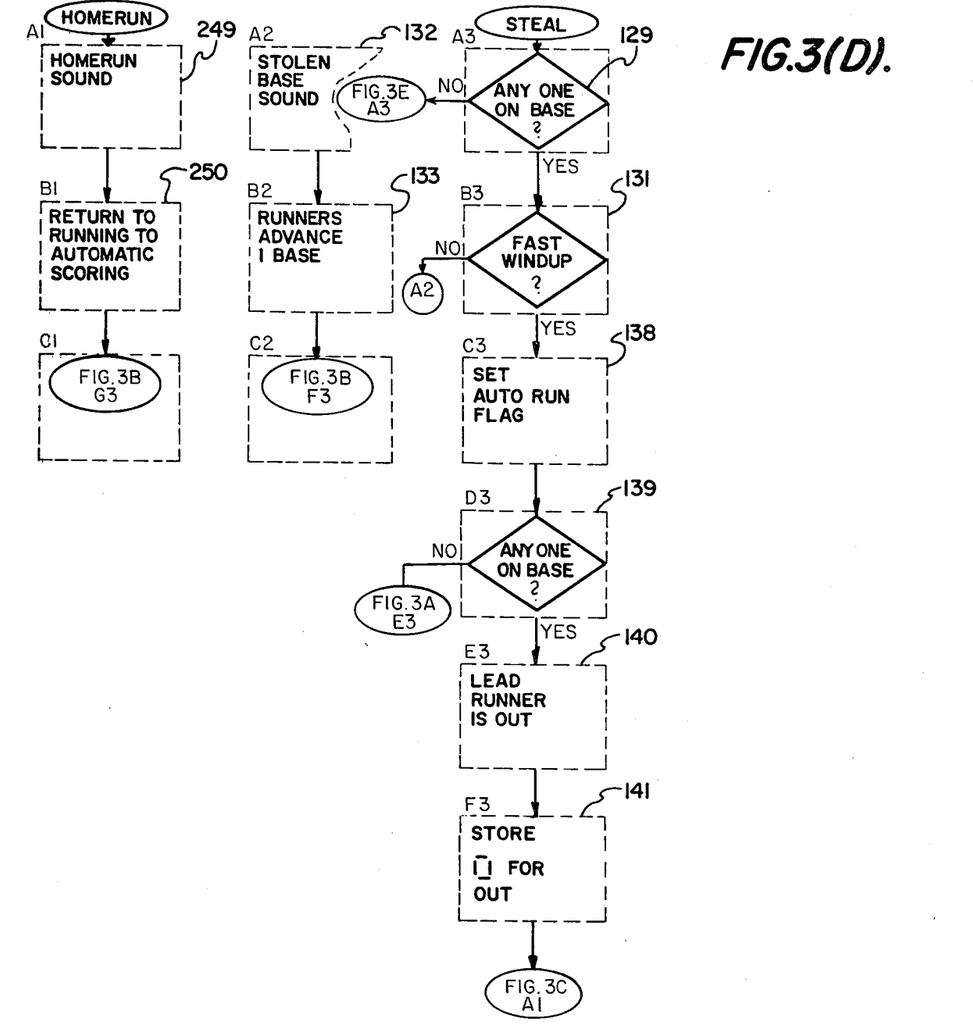

From step 141 the program moves to step 143 shown in FIG. 3(c) at which the digits 21 and 22 are caused to show the number of balls and strikes and then to step 144 to cause the speaker 24 to make an out sound. From step 144, the program moves to step 145 to determine whether the team at bat has three outs. If there are not yet three outs, the program moves to step 147 at which a determination is made whether an out caused the program to enter this path of the routine. If an out is not the cause, the program moves to step 148 to show the catcher catching the ball and to provide a thud sound from the speaker 24. The program then moves to step 149 to show the previous ball and strike count and to step 150 to return the ball to the pitcher and show the new ball and strike count. From step 150 the program returns to step 104 shown in FIG. 3(a).

If at step 147 an out caused the entry, the program moves to step 152 to show the type of out on digits 21 and 22. These are indicated by the symbols FO (fly out), GO (ground out), SO (strike out), and O (other). From step 152, the program moves to step 119 and continues as explained above to display the various statistics.

If at step 145 there are three outs on the team batting, the program moves to step 155 to clear all runners from the bases, to step 156 to produce a sound on speaker 24 indicating a change of team, and to step 157 to determine whether it is time for the next inning to occur or, alternatively, the second team is up in the same inning. If it is not time for the next inning, the program moves to step 147 and proceeds as explained above. If it is time for the next inning, the program moves to step 159 to cause the control circuitry to indicate that the visiting team is up and to step 160 to determine whether it is the tenth inning (the game is over). If it is not the tenth inning, the program moves to step 147 and proceeds as explained above. If it is the tenth inning, the program moves to step 161 to store an indication in memory that the game is over and that sounds indicating that the game is over are to be produced. From step 161, the program moves to step 113 and continues as explained to display the scores for the teams.

Figure 3E:
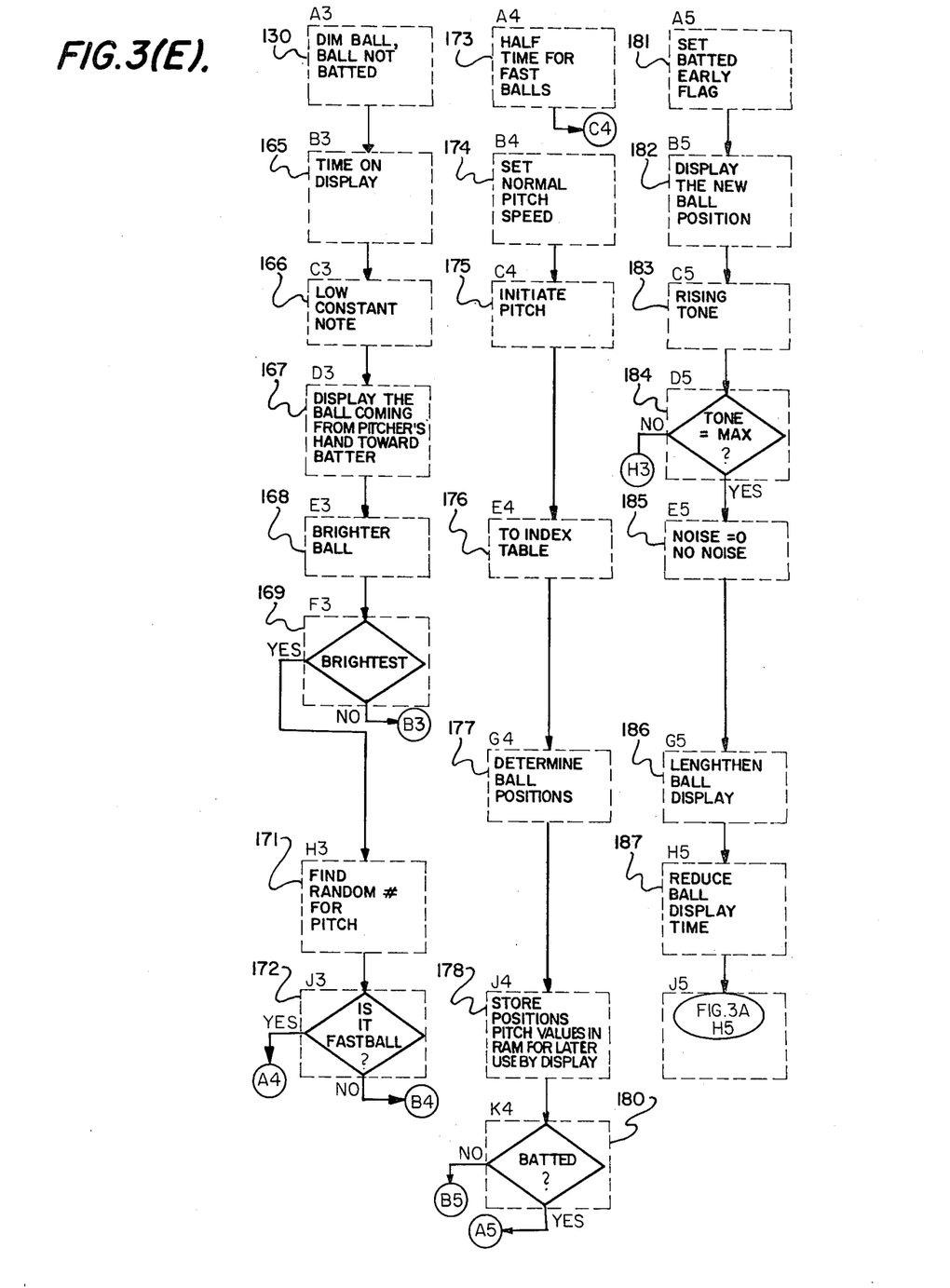

If at step 128 shown in FIG. 3(a), the steal key 18 has not been depressed, the program moves to step 130 shown in FIG. 3(e) to store an indication in memory that the ball position light is to be turned on at a dim level, that a ball movement tone is to be produced at a first frequency, and that the ball has not yet been batted. The program then moves to step 165 to store an indication in memory that the ball is to be thrown at normal pitch speed. From step 165 the program moves to step 166 to store an indication in memory for the production of a low constant tone and to step 167 to display the ball at ball position one at a low light level.

From step 167 the program moves to step 168 to cause the ball in position one to brighten incrementally. The program then moves to step 169 to determine whether the ball is as bright as it can be made. If it is not yet as bright as possible, the program recycles to step 165 and it moves through the program as explained above to cause the ball to brighten to its brightest at position one in incremental steps.

When at step 169 the ball at position one is found to be as bright as possible, the program moves to step 171 to recover the random number stored previously from which the type of pitch is determined. The program then moves to step 172 to determine whether the ball being thrown is a fast ball. If the ball being thrown is a fast ball (whether normal or rising), the program moves to step 173 to set the speed of the pitch so that the time between ball positions is half the time which is normally used between ball positions. If at step 172 the ball being thrown is not a fast ball, the program moves to step 174 to set the ball movement speed (the pitch speed) at the normal speed between ball positions.

From steps 173 and 174, the program moves to step 175 to initiate the movement between ball positions and to step 176 to utilize a lookup table to determine the meaning of the random number generated by which a pitch is to be selected. In the preferred embodiment, eight pitches are possible and each random number selected will indicate one of those pitches. The program then moves to step 177 to determine the ball positions of the particular pitch selected and to step 178 to store those positions in the RAM memory of the control circuit 40. From step 178, the program moves to step 180 to determine whether the ball has yet been batted (key 17 pressed).

If the ball has been batted at step 180, the program moves to step 181 to store in memory an indication that the ball was batted early, to step 182 to display the new ball position, and to step 183 to raise incrementally the frequency of the tone utilized to indicate the travel of the ball during a pitch. The program moves directly to step 182 if the hit key 17 is not depressed at step 180 and then to step 183. From step 183, the program moves to step 184 to determine whether the ball travel tone has yet been raised to its maximum, and if not, the program returns to step 171 and proceeds as explained above to step through the remaining positions of the particular pitch.

When at step 184 the tone has risen to its maximum so that the ball is at the final position of the pitch, the program moves to step 185 to eliminate all sounds emanating from the speaker 24 and to step 186 to cause the ball position on the display 14 to remain lit for a time substantially longer than normal to provide time for an operator of the game to depress the hit key 17. The program then moves to step 187 at which the time for the ball to be displayed, as explained at step 186, is reduced to one half if the faster mode of the game is being played so that the ball light goes out quickly.

From step 187, the program moves to step 190 shown in FIG. 3(a). At step 190 a determination is made as to whether the batter has swung early as indicated by the indication stored at step 181. If the batter has swung early, the program moves to step 192 shown in FIG. 3(c). At step 191 the control circuit 40 is caused to store an indication that one more strike has been registered against the batter. The program then moves to step 192 to determine whether the batter now has three strikes. If the batter does not have three strikes, the program moves to step 147 and proceeds as explained above. If the batter has three strikes at step 192, the program moves to step 193 to store an indication that the batter has struck out and then moves to step 143 and proceeds as explained above.

If at step 190 shown in FIG. 3(a), the batter has not swung early, the program moves to step 195 to determine whether the hit key 17 has been depressed. If the hit key 17 has not been depressed, the program moves to step 196 shown in FIG. 3(c). At step 196 a determination is made as to whether the pitch was a ball. As explained above, this is determined by the type of pitch thrown (e.g., a fast ball is always a strike while a sinker is always a ball, etc.). If a ball has not been thrown, the program moves to step 191 to record a strike and to proceed as explained above. If the pitch thrown is a ball, the program moves to step 197 to determine whether the pitch is ball four on this batter. If this is not ball four, the program moves to step 147 and proceeds as explained above. If at step 197 a fourth ball has been thrown, the program moves to step 198 to reset the indication of balls and strikes to zero and to step 199 to cause the batter to walk. From step 199, the program proceeds to step 135 shown in FIG. 3(b).

At step 135 the program stores the number of bases which the particular runner has to run. The program then moves to step 200 at which a determination is made as to whether the movement of the runner has caused a run to score. If the movement has caused a run to score, the program moves to step 201 to cause the speaker 24 to emit a sound indicating a run has scored and adds one run to the team's total runs in the RAM memory. The program then moves to step 203. The program moves to step 203 as well from step 200 if a run does not score. At step 203 any runner at home plate is removed and sent to the dugout. The program then moves to step 204 to determine whether the runner involved has run the maximum number of bases allowed as set at step 135. If the runner has not, the program moves to step 205 to subtract from those bases which the runner has left to run. If at step 204 the runner has run the maximum number of bases, the program moves to step 206 to determine whether the game is presently in the automatic run mode (during a walk, a steal, or a home run). If the game is not in the automatic run mode, the program moves to step 200 and recycles as explained above. If the game is in the automatic run mode, the program moves to step 104 shown in FIG. 3(a) at which the pitcher receives the ball and continues as explained above.

From step 205, the program moves to step 208 at which a determination is made whether the number of bases to run is greater than three. If the number is greater than three, the program moves to step 209 to display an indication that a runner is going to first base. The program then moves to step 210. The program also moves to step 210 from step 208 if the number of bases remaining to be run is not greater than three. At step 210 the program stores an indication of the number of steps to be taken between bases. The program then moves to step 211 to eliminate all indications from the display 14 other than the dimly lit runner positions. The program then moves to step 212 to store an indication of the base the runner has reached.

From step 212, the program moves to step 214 at which it is determined whether the game is in the automatic run mode. If the game is in the automatic run mode (walk, steal, home run), the program moves to step 215 and slows down the runner. From step 215, the program moves to step 217. The program also moves to step 217 from step 214 is the program is not in the automatic run mode.

At step 217, the program causes the light at the base which a runner is approaching to brighten with each step of his movement and again tests to determine whether the program is in the automatic run mode. If the program is in the automatic run mode, the program moves to step 218 where it is determined whether there are presently men on base. If there are men on base, the program recycles to step 200 and proceeds as explained above to deal with those runners.

If at step 218 there are no men on base, the program recycles to step 214 and continues as explained above. If at step 217 the program is not in the automatic run mode, the program moves to step 220 at which it is determined whether the run key 18 has been newly depressed. If not, the program moves to step 221 where a run timer which allows a sufficient time for an average operator to move a runner the designated number of bases is incremented towards zero. The program then moves to step 223 to determine when the time allowed for the runner to finish the particular run is up. If time is up, the program moves to step 224 to determine whether there are men on base.

If at step 220 the run key 18 has just been depressed, the program moves to step 222 to store an indication of this fact and to step 219 to determine if the runner has passed the last base allowed (has taken more than one extra base). If he has, the program moves to step 129 shown in FIG. 3(d) and proceeds as explained to call the runner out. If not, the program recycles to step 218.

If at step 224 there are men on base, the program moves to step 225 and then returns to step 200 and proceeds as explained above. At step 225 the program is set to the AUTO RUN mode and the runners are stopped on base.

If at step 223 the time to run has not expired, the program moves to step 226 to determine whether there are men on base. If there are no men on base (i.e., the men haven't reached their bases yet), the program recycles to step 214. If there are men on base, the program moves to step 227 to determine whether the men have already reached base. If the men are already on base, the program moves to step 214 and recycles as explained. If a man is not already on base, the program moves to step 228 to move the man to the base and to cause the speaker 24 to emit a sound indicating that he is on the base. The program then moves to step 214 and proceeds as explained.

If at step 224 it is determined that men are not on base (i.e., they haven't reached base yet though they are running), the program moves to step 138 and proceeds as explained above to throw out the lead runner.

If at step 195 shown in FIG. 3 (a) the hit key 17 was depressed, the program moves to step 230 where it is determined whether the pitch was a ball. If the pitch was a ball and the batter swung, the program moves to step 191 shown in FIG. 3(c) to record a strike and proceeds as explained above. This occurs because it is considered that when a batter swings at a pitch which is a ball, the pitch is missed and is, consequently, scored as a strike. If, on the other hand, the pitch is not a ball, the program moves to step 231 where it is determined whether the hit key 17 is depressed during the earliest "on" period of the ball light at the last position for the particular pitch and at the beginning of the interval. If key 17 is depressed at this time, the program moves to step 232 to record in memory that a home run has been hit and to step 233 to store in memory that four bases are to be advanced. The program then moves to step 234 to cause the speaker 24 to produce a high rising sound and to step 235 to cause the ball position light to fade as though the ball were disappearing into the distance.

If at step 231 the hit key 17 was not pressed during the earliest interval during which the ball occupied the last position in which a home run can be hit, the program moves to step 236 to determine whether a double or a triple was hit; this again depends on how early the key 17 is depressed during the period the ball is in its last position. If a double or a triple is indicated at step 236, the program moves to step 237 at which it is determined whether a flyout (a random chance of one in five) has occurred.

If the random chance does not indicate that a flyout has occurred, the program moves to step 233 to store the number of bases to advance (two or three) and proceeds as explained above. If a flyout has occurred, the program moves to step 238 to store the type of out and then moves to step 233 and proceeds as explained above.

If at step 236 a double or triple is not hit because the hit key 17 was not pressed early enough in the period during which the ball is in the last position, the program moves to step 239 to determine whether a single is hit (again, how early was key 17 pressed). If a single is hit, the program moves to step 233 to store the number of bases (one) the runner is to advance and proceeds as explained above. If a single is not hit, the program moves to step 240 to determine if a foul tip is hit. If a foul tip is not hit, the program moves to step 241 to store an indication in memory that a groundout has occurred and then moves to step 233 and proceeds as explained above. If at step 240 a foul tip occurs, the program moves to step 242 to store an indication that a foul tip has occurred and then moves to step 233 and proceeds as explained above.

From step 235, the program moves to step 243 to determine whether an out was made. These outs will have been previously stored in memory, e.g., steps 238 and 241. If so, the program moves to step 143 shown in FIG. 3(c) and proceeds with the program through the "out" subroutine as explained above. If not, the program moves to step 244 to determine whether a foul tip occurred. If a foul tip ocurred, the program moves to step 245 to store an indication that a foul tip occurred and to step 246 where it is determined whether two strikes have already been recorded. If two strikes have been recorded, the program moves to step 147 shown in FIG. 3(c) and proceeds as explained above. If less than two strikes have been recorded at step 246, the program moves to step 191 shown in FIG. 3(c) and records another strike. The program then proceeds as explained above.

If at step 244 a foul tip did not occur, the program moves to step 247 to determine whether a home run was hit as was indicated by the storage of this indication at step 232. If a home run was hit, the program moves to step 248 to reset the balls and strikes indication for digits 21 and 22 and then moves to step 249 shown in FIG. 3(d) to cause the speaker 24 to indicate that a home run was hit by producing the home run sound. From step 249, the program moves to step 250 to cause the mode of the game to move to the automatic scoring mode and then recycles to step 200 shown in FIG. 3(b) and proceeds as explained above with the run mode.

If at step 247 a home run has not been hit, the program moves to step 252 to reset the ball and strike counts to zero and then moves to step 253 shown in FIG. 3(b). At step 253, an indication is stored in memory that the game is in the manual run mode. The program then moves to step 254 to provide the particular time for running bases in the one and two modes. In the two mode there is less time to run between bases. The program then moves to step 255 to provide time for running one extra base at optimum speed. From step 255, the program moves to step 256 to cause the speaker 24 to provide a tone for each base to be run (a double produces two beeps). From step 256, the program moves to step 200 and proceeds as explained above with the run mode.

As will be understood by those skilled in the art, many different programs may be utilized to implement the flow charts disclosed in this specification. Obviously, those programs will vary from one another in different degrees. However, it is well within the skill of the art of the computer programmer to provide particular programs for implementing each of the steps of the flow charts disclosed herein. It is also to be understood that various microcomputer circuits might be programmed for implementing each of the steps of the flow charts disclosed herein without departing from the teaching of the invention. It is therefore to be understood that, because various other embodiments may be devised by those skilled in the art without departing from the spirit and scope of the invention, it is the intention of the inventors to be limited only by the scope of the claims appended hereto.

What is claimed is:

1. An electric baseball game comprising:
  a display having indicia in the form of first illuminable indicators simulating base runners, second illuminable indicators simulating a ball, and indicia representing a pitcher, a batter, and bases;
  input means for providing input signals to cause the pitcher to throw the ball, to cause the batter to swing at the ball, and to cause a runner to run toward a base;
  control means responsive to the input means for controlling the illuminable indicators to depict the play of the game, including means for incrementally varying the brightness of one of the first illuminable indicators in a sequential manner to simulate movement and rate of movement of a base runner toward that one first illuminable indicator, and means for incrementally varying one of the second illuminable indicators in a sequential manner to simulate movement and rate of movement of the ball away from that one second illuminable indicator.

2. The game of claim 1 in which the control means includes means for incrementally increasing the brightness of one of the first illuminable indicators as a runner approaches that one first illuminable indicator, where the rate of increase of brightness is proportional to the speed of that runner.

3. The game of claim 1 in which the control means includes means for incrementally increasing the brightness of one of the second illuminable indicators as the pitcher throws the ball away from that one second illuminable indicator, where the rate of increase of brightness is proportional to the speed of the ball.

4. The game of claim 3 in which the control means includes means for causing the batter to hit the ball, and means for incrementally decreasing the brightness of another one of the second illuminable indicators to simulate movement of the hit ball away from that another one of the second illuminable indicators.

5. An electronic baseball game comprising:
  a display having indicia in the form of first illuminable indicators, each simulating a base runner, second illuminable indicators simulating a ball, and indicia representing a pitcher, a batter, and bases;
  input means for providing input signals to cause the pitcher to throw the ball, and to cause a runner to run toward a base;
  control means responsive to the input means for controlling the illuminable indicators to depict the play of the game, including means for selecting on a random basis a fast pitcher windup or a slow pitcher windup, means for illuminating the second illuminable indicators at a rate proportional to the speed of the selected windup; means for permitting a runner to safely advance one base during a slow windup, and means for preventing a runner from advancing one base during a fast windup.

* * * * *